(12) United States Patent
Cohen et al.

(10) Patent No.: US 6,510,426 B1
(45) Date of Patent: Jan. 21, 2003

(54) METHOD AND APPARATUS FOR COMPACTING A METADATAS STREAM IN A DATA PROCESSING SYSTEM

(75) Inventors: Marc L. Cohen, Austin, TX (US); Michael R. Cooper, Austin, TX (US); Patrick Edward Nogay, Austin, TX (US); Mark Wayne Vanderwiele, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/163,915

(22) Filed: Sep. 30, 1998

(51) Int. Cl.$^7$ ............................................. G06F 17/00

(52) U.S. Cl. ....................................... 707/4; 707/103 R (58) Field of Search ................ 707/1–206; 709/100–332

(56) References Cited

U.S. PATENT DOCUMENTS

| | | | |
|---|---|---|---|
| 5,327,559 A | 7/1994 | Priven et al. ................ | 395/700 |
| 5,339,392 A | 8/1994 | Rosberg et al. ............. | 395/161 |
| 5,432,925 A | 7/1995 | Abraham et al. ............ | 395/500 |
| 5,497,491 A | 3/1996 | Mitchell et al. ............. | 395/700 |
| 5,509,115 A | 4/1996 | Butterfield et al. ......... | 395/147 |
| 5,602,974 A | 2/1997 | Shaw et al. .................. | 395/114 |
| 5,668,640 A | 9/1997 | Nozawa et al. ............. | 358/434 |
| 5,699,492 A | 12/1997 | Karaki ........................ | 395/109 |
| 5,745,899 A | 4/1998 | Burrows ..................... | 707/102 |
| 5,748,188 A | 5/1998 | Hu et al. ..................... | 345/326 |
| 5,754,750 A | 5/1998 | Butterfield et al. ......... | 395/118 |

OTHER PUBLICATIONS

Hou et al., "Distributed and parallel execution of Java programs on a DSM system", Cluster Computing and the Grid, 2001, Proceedings, First IEEE/ACM International Symposium on, 2001, pp. 555–559.*

Folino et al., "CELLAR: a high level cellular programming lanaguage with regions", Parallel and Distributed Processing, 2000, Proceedings, 8th Euromicro Workshop on, 1999, pp. 259–266.*

James, "Web–based organization of relevant knowledge for web–oriented instruction and learning", Frontiers in Education Conference, 1997, 27th Annual Conference, Teaching and Learning in an Era of Change, Proceedings, vol. 2, 1997, pp. 1076–1080, volume.*

International Business Machines; Displaying and Manipulating Relationships; Dec. 1995; pp. 391–395; IBM Technical Disclosure Bulletin; vol. 38, No. 12.

International Business Machines; Generation of Object Class Methods from Process Models of Workflow Environments; Aug. 1997; IBM Technical Disclosure Bulletin; vol. 40, No. 08; pp. 39–46.

International Business Machines; Structured Metadata for Application Specific Viewrs for Streamed Internet Video/Audio; Oct. 1997; IBM Technical Disclosure Bulletin; vol. 40, No. 10; pp. 123–127.

\* cited by examiner

*Primary Examiner*—David Jung
(74) *Attorney, Agent, or Firm*—Duke W. Yee; Jeffrey S. LaBaw (57) ABSTRACT

A method and apparatus in a data processing system for generating a metadata stream. An attribute call is received to set an attribute. In response, a first database is queried to determine whether the attribute call is present in the first database. The first database is updated in response to the attribute call being absent in the first database. In response to receiving a primitive call, an attribute call associated with the primitive is retrieved from the first database. A determination is made as to whether the attribute call associated with the primitive is present in a second database. The second database is; updated to include the attribute call associated with the primitive call in response to the attribute call associated with the primitive call being absent in the second database. The attribute call associated with the primitive call and the primitive call is placed in the metadata stream.

40 Claims, 7 Drawing Sheets

METHOD AND APPARATUS FOR COMPACTING A METADATAS STREAM IN A DATA PROCESSING SYSTEM

CROSS-REFERENCE TO RELATED APPLICATION

The present invention is related to the following application entitled "Method and Apparatus in a Data Processing System for Generating Metadata Streams With Per Page Data", filed even date hereof, and is incorporated herein by reference, now U.S. Pat. No. 6,356,355.

TECHNICAL FIELD

The present invention relates generally to an improved data processing system and in particular to a method and apparatus for processing a data stream. Still more particularly, the present invention provides a method and apparatus for reducing the size of a data stream.

DESCRIPTION OF RELATED ART

Currently, metadata streams are created in the order that applications call graphical functions. Metadata is data about data. For example, the title, subject, author, and size of a file constitute metadata about a file. With respect to graphics, the current position, color, and size of a primitive, such as a box, constitute the metadata for the box. Currently, the application is relied on to optimize graphical functions. With object oriented computing environments, the metadata streams become saturated with repetitive and redundant attribute setting calls. This saturation occurs because objects within the object oriented computing environments may generate attribute setting calls without any knowledge of what other setting calls that other objects are making. Many constructors, the initial method of an object, initialize a set of attributes regardless of which graphical primitives are called and which attributes are actually needed. The attributes are set back to defaults, which generally happens for destructors, terminating objects. In many types of applications, such as spreadsheets, graphical applications, image applications, and front ends to databases, generic attribute mapping is used from the application layer. This generic attribute mapping from the application layer causes several attribute types to be affected even with only one attribute type being used in subsequent primitive calls. In addition, many applications set multiple attributes several times even back to the default value before they are ever used by a primitive call. As a result, the overhead in a metadata stream increases with the generic attribute mapping and the repeated changing of attributes prior to use in a primitive call.

Therefore, it would be advantageous to have an improved method and apparatus for managing a graphics data stream.

SUMMARY OF THE INVENTION

The present invention provides a method and apparatus in a data processing system for generating a metadata stream. An attribute call is received to set an attribute. In response, a first database is queried to determine whether the attribute call is present in the first database. The first database is updated in response to the attribute call being absent or different in the first database. In response to receiving a primitive call, an attribute call associated with the primitive is retrieved from the first database. A determination is made as to whether the attribute associated with the primitive is present in a second database. The second database is updated to include the attribute associated with the primitive call in response to the attribute associated with the primitive call being absent or different in the second database. The attribute call associated with the primitive call and the primitive call is placed in the metadata stream.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
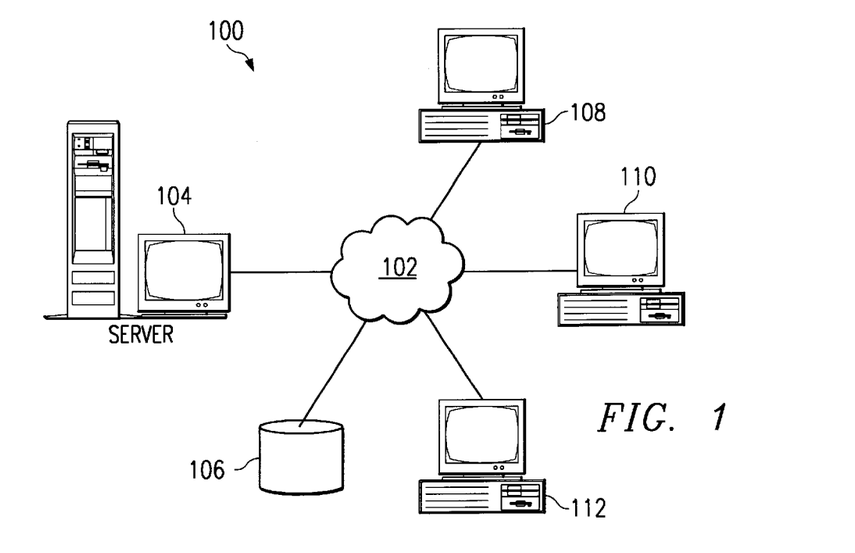
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as an umber of different types of networks, such as for example, an intranet or a local area network.

FIG. 1 is intended as an example, and not as an architectural limitation for the processes of the present invention.

Figure 2:
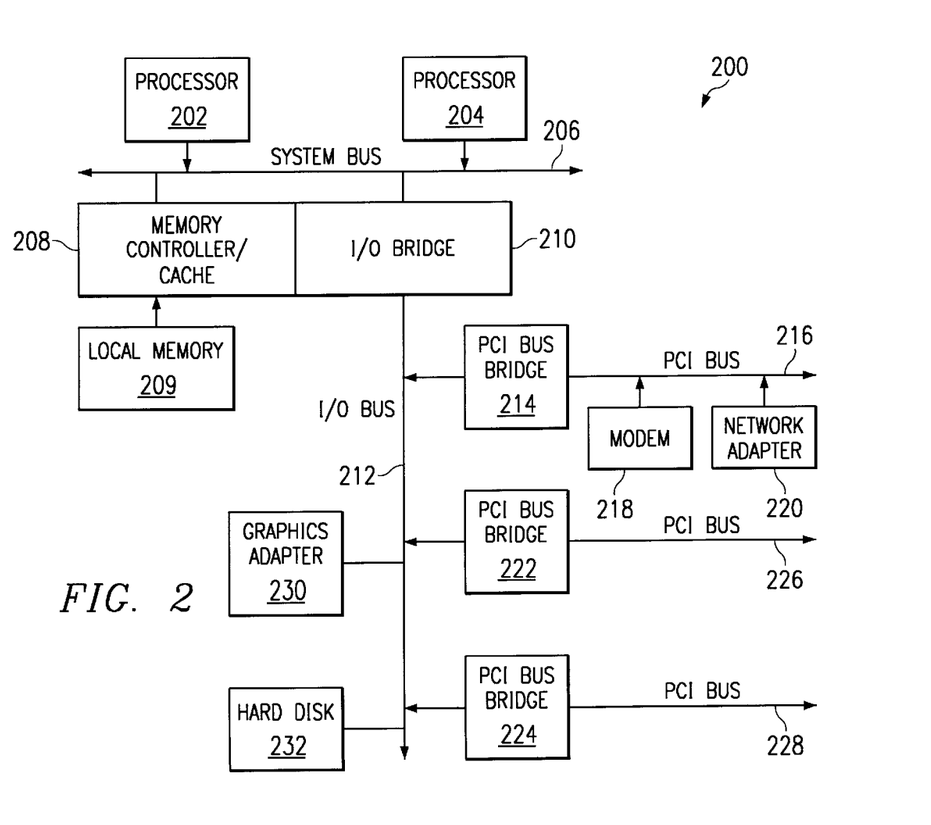
FIG. 2 is a block diagram of a data processing system which may be implemented as a server in accordance to the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
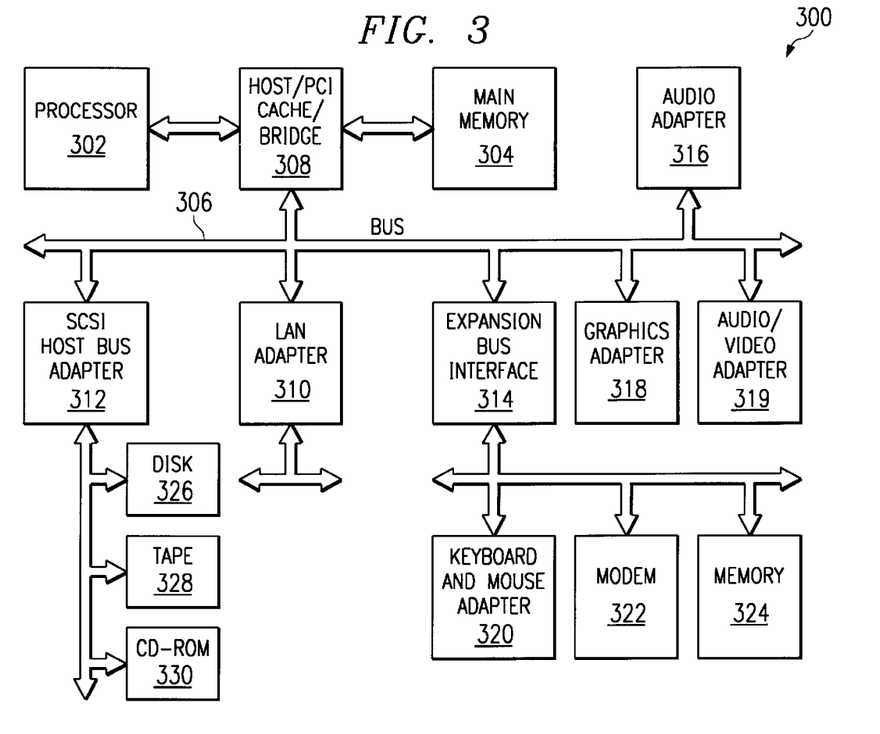
FIG. 3 is a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area-network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of from International Business Machines Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to multiprocessor data processing system.

The present invention provides a method, apparatus, and instructions for managing a data stream, such as a metadata stream. The present invention provides a mechanism of effectively managing attribute calls in either the creation of the metadata stream or via a post processor to significantly reduce the overhead required to process the metadata stream. This reduction in overhead is especially important in a network and over the Internet. The present invention provides a mechanism that only updates attributes in the metadata stream on primitive calls. A primitive is a shape, such as a line, circle, character, curve, or polygon, that can be drawn, stored, and manipulated as a discrete entity by a graphics program. A primitive is one of the elements from which a large graphic design is created. A primitive call is a call to draw a primitive, such as, for example, draw polyline, draw arc, fill arc, draw box, fill box, and draw line. An attribute is used to set a characteristic for a primitive. An attribute may be, for example, color, mix modes, directions, view windows, line style, transforms, and current position.

Figure 4:
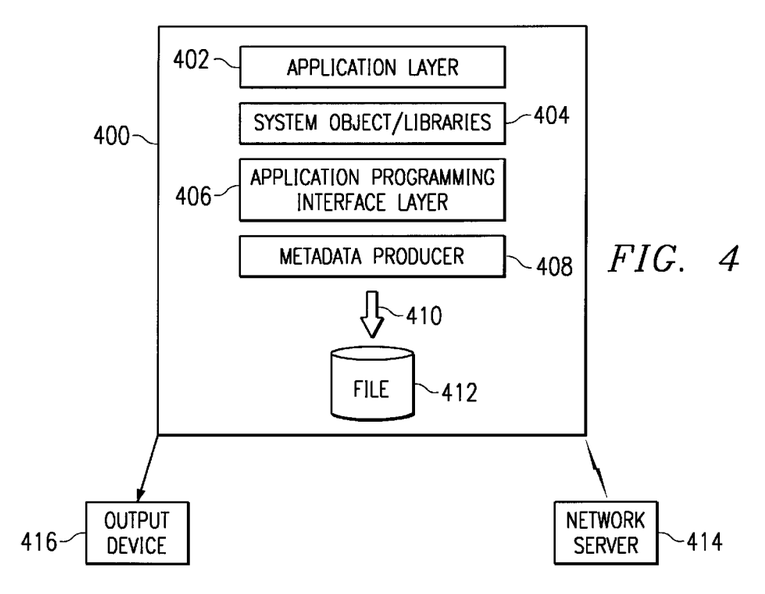
FIG. 4 is a block diagram of various components used in creating and managing metadata streams in accordance with a preferred embodiment of the present invention.

Turning now to FIG. 4, a block diagram of various components used in creating and managing metadata streams are illustrated in accordance with a preferred embodiment of the present invention. Data processing system 400 includes an application layer 402 that contains various objects and applications with which a user may interface. For example, an application within application layer 402 may be a spreadsheet application, word processing program or CAD program. The applications and objects within application layer 402 generate various attributes and primitive calls. System object/libraries 404 provides various functions that applications or objects within application layer 402 may call. For example, system object/libraries 404 may include code for generating and displaying scroll bar and list box objects so that this code does not need to be coded in an application within application layer 402. Application programming interface layer 406 receives calls either directly from application layer 402 or through system object/libraries 404. If an application within application layer 402 makes a call to system object/libraries 404, this layer will in turn make a call to application programming interface layer 406. Metadata producer 408, also referred to as a metafile producer, is code that supports application programming interface layer 406. For example, in Windows 95, the metadata producer would be a GDI system (DLL) library. In OS/2, the metadata producer is a PMGPI. Metadata producer 408 generates a metadata stream 410 that may be stored in a file 412 within data processing system 400 or sent to a server 414, which may be on a network, such as, for example, a local area network, the Internet, or an intranet. Metadata stream 410 also may be sent to an output device 416, such as, for example, a printer or display device. In the depicted example, metadata stream 410 may be sent directly to network server 414 or output device 416. Alternatively, metadata stream 410 may be first sent to file 412 and then to network server 414 or output device 416.

The depicted example in FIG. 4 is implemented in an operating system. This example however does not preclude the implementation of the processes of the present invention in other areas. The present invention may be implemented as a module outside of the operating system to process the metadata stream prior to the metadata stream being sent to an output device. For example, the module may be a print queue or print spooler.

Figure 5:
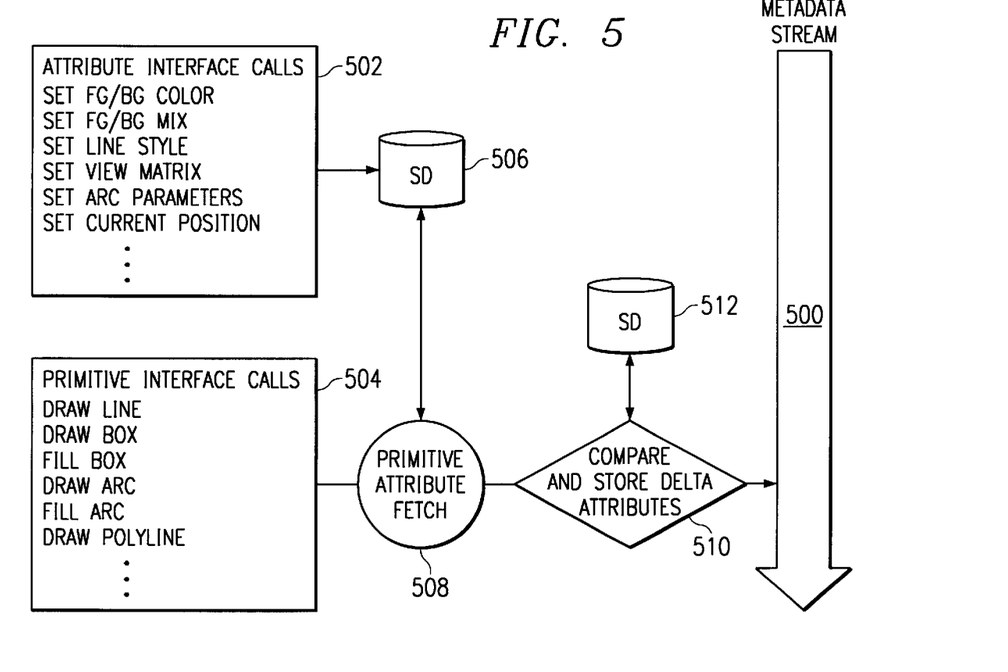
FIG. 5 is an illustration of the creation of a metadata stream in accordance with a preferred embodiment of the present invention.

With reference now to FIG. 5, an illustration of the creation of a metadata stream is depicted in accordance with a preferred embodiment of the present invention. Metadata stream 500 is created through various attribute interface calls 502 and primitive interface calls 504. Attribute interface calls may be made by either an application or object within application layer 402 or by system object/libraries 404 to application programming interface layer 406 in FIG. 4. Attribute interface calls 502 are stored in storage device (SD) 506, which is a random access memory (RAM). Of course these attributes may be stored in other types of storage devices, such as a hard disk drive. Storage device 506 is used to track the current attributes set by the application or applications.

Primitive interface calls 504 results in a primitive attribute fetch in block 508 occurring. A primitive attribute fetch results in attributes, associated with primitive interface calls 504, being fetched from storage device 506 for the particular primitive interface call. The fetched attribute or attributes are compared in block 510 with any attribute stored within storage device (SD) 512 that are associated with the primitive interface call. In the depicted example, storage device 512 is a RAM. This storage device is used to store data describing the current attributes set within metadata stream 500. Any changes in attributes are stored in storage device 512 and the primitive interface calls with attributes are placed in metadata stream 500.

Figure 6:
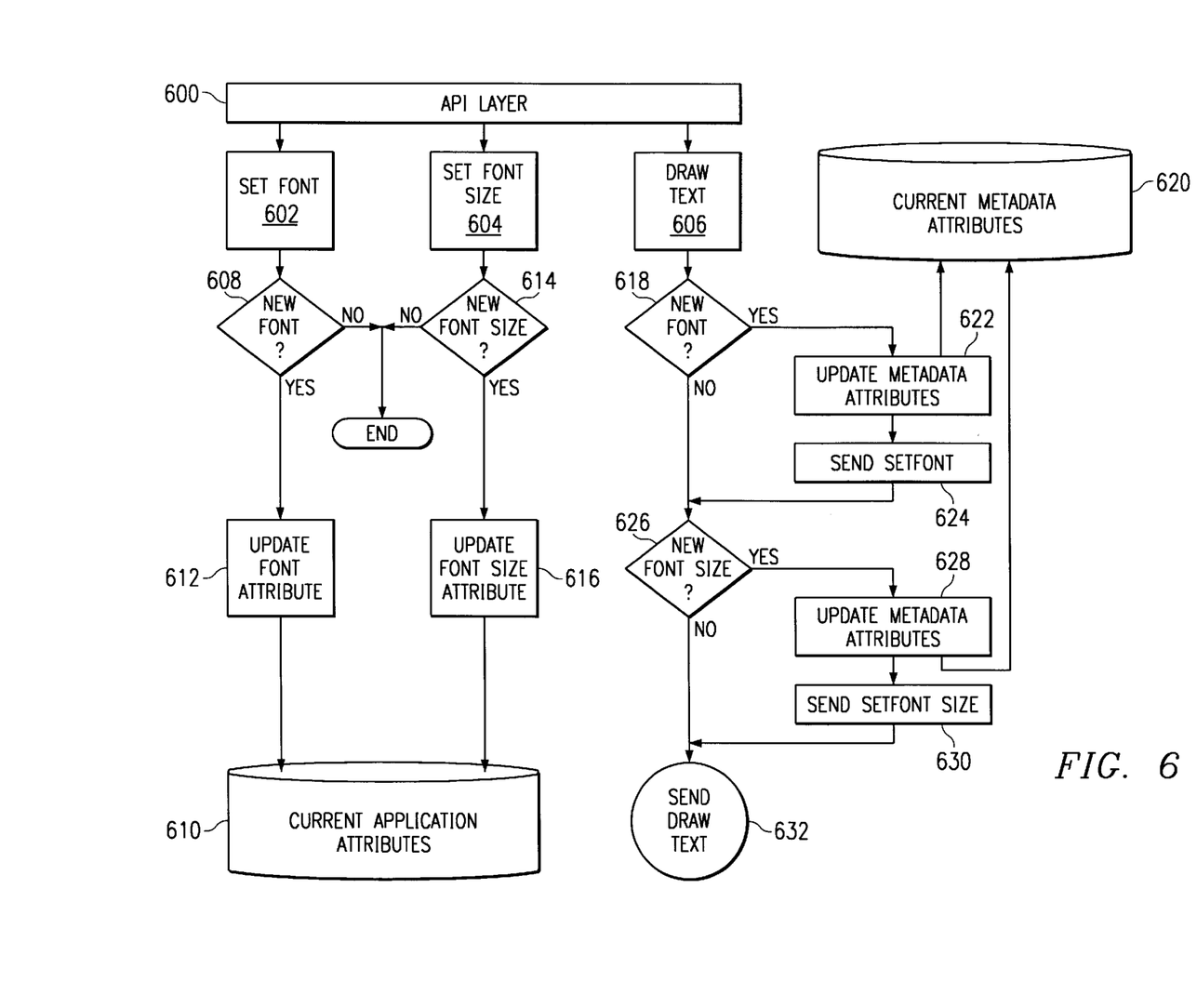
FIG. 6 is a data flow diagram of a process for creating a metadata stream in accordance with a preferred embodiment of the present invention.

With reference now to FIG. 6, a data flow diagram of a process for creating a metadata stream is depicted in accordance with a preferred embodiment of the present invention. Various calls to set attributes and calls to draw primitives are received from application programming interface layer 600. In the depicted example in FIG. 6, the attribute calls are received from API layer 600, such as, set font call 602 and set font size call 604. The primitive call, draw text call 606, is received from API layer 600. Set font call 602 results in a determination as to whether set font call 602 results in a new font attribute being set in block 608. This determination is used by querying a current application attributes database 610. Current application attributes database 610 may be stored in a storage device, such as storage device 506 in FIG. 5.

If a new font is present as a result of the set font call, a font attribute update is performed in block 612 to update the font attribute in current application attributes database 610. Otherwise, no action is taken and data flow terminates for this particular attribute call.

In response to set font size call 604 from API layer 600, a determination is made as to whether this call setting the font size results in a new font size in block 614. If a new font size occurs, the font size attribute is updated in block 616.

In response to draw text call 606, a determination is made as to whether a new font is to be drawn in block 618. Draw text call 606 is an example of a graphics primitive call, which is any call that causes an actual modification on the output device. This determination in block 618 is made by querying current application attributes database 610 for the font attribute and comparing that font to the font attribute stored in current metadata attributes database 620. Current application attribute database 610 is employed to track the attributes currently set by an application while current metadata attributes database 620 is used to track the attributes currently set within a metadata stream. If a new font is present in current application attributes database 610, current metadata attributes database 620 is updated in block 622. The update results in the attributes in current metadata attributes database 620 being updated to reflect the new font attribute for the primitive call, draw text call 606.

Thereafter, a set font is sent to the metadata stream (not shown) in block 624 and then a determination is made as to whether a new font size has been set in block 626. This determination is made by querying current application attributes database 610 for the font size attribute and comparing that with the font size attribute in current metadata attributes database 620. If a new font size is present, current metadata attributes database 620 is updated in block 628. Then, a send set font size is sent to the metadata stream in block 630. Thereafter, a send draw text is made to the metadata stream in block 632.

Blocks 624, 630, and 632 result in metadata being placed within a metadata stream. Using this mechanism, metadata is not added to a metadata stream each time a set attribute call is made.

The processes described in FIGS. 5 and 6 may be implemented within metadata producer 408 in FIG. 4.

Figure 7:
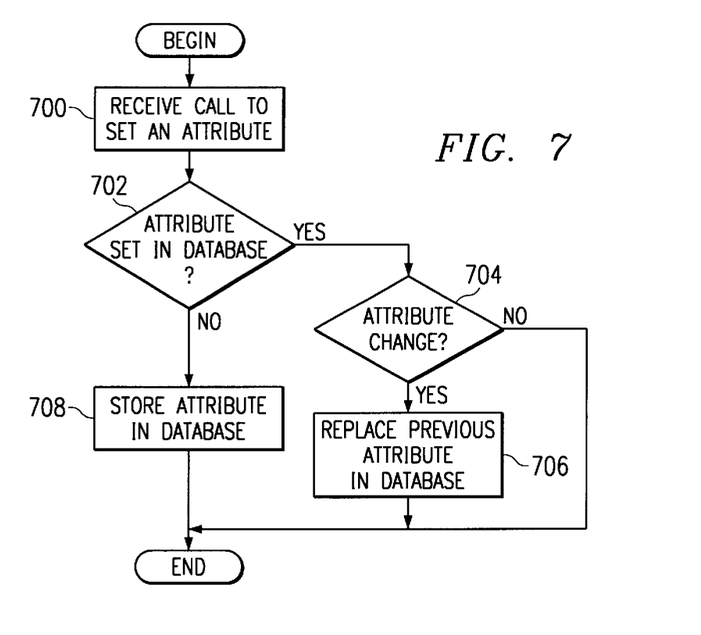
FIG. 7 is a flowchart of a process for tracking attribute setting calls from an application in accordance with a preferred embodiment of the present invention.

With reference now to FIG. 7, a flowchart of a process for tracking attribute setting calls from an application is depicted in accordance with a preferred embodiment of the present invention. This process may be implemented within metadata producer 408 in FIG. 4 to track current application attributes. The process begins by receiving a call to set an attribute (step 700). A determination is made as to whether the attribute being set is present in the current application attribute database (step 702). If the attribute is present within this database, a determination is made as to whether the attribute has changed (step 704). This determination is used to identify a change in an attribute, such as, for example, a change of color for a primitive. If the attribute has changed, the attribute in the database is replaced with the new attribute (step 706) with the process terminating thereafter. Otherwise, the process terminates without changing the attribute in the database.

With reference now to step 702, if the attribute is currently not in the current application attributes database, the process then stores the attribute in the database (step 708) with the process terminating thereafter.

Figure 8:
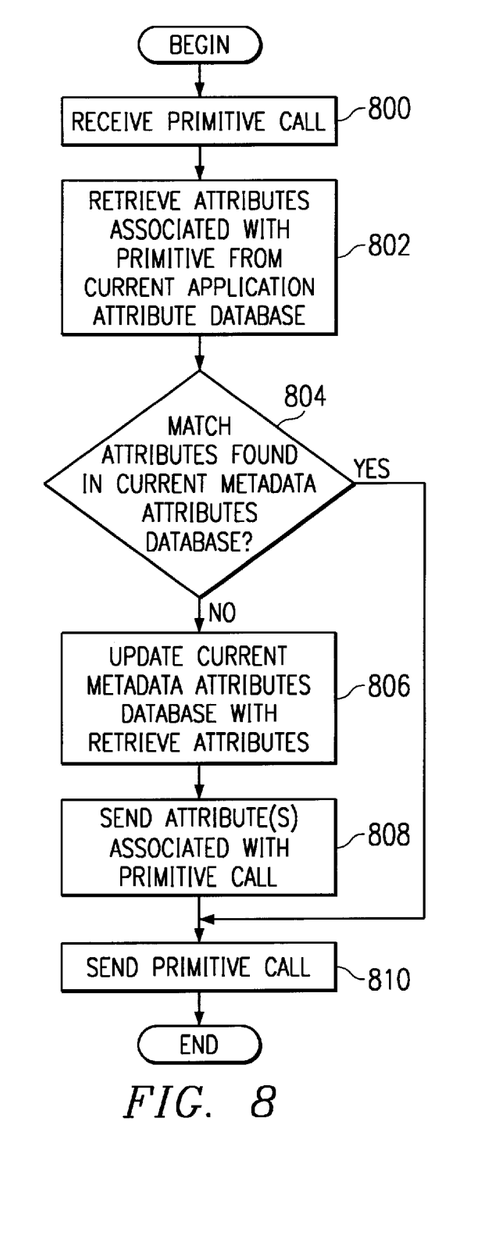
FIG. 8 is a flowchart of a process for generating a metadata stream in accordance with a preferred embodiment of the present invention.

Turning now to FIG. 8, a flowchart of a process for generating a metadata stream is depicted in accordance with a preferred embodiment of the present invention. The process begins by receiving a primitive call (step 800). In response to this call, attributes associated with the primitive are retrieved from the current application attributes database (step 802). A determination is made as to whether these retrieved attributes match attributes found in the current metadata attributes database (step 804). The determination determines whether the attributes are present in the database and if the attributes are present, whether the attributes match each other. For example, for an arc primitive, arc parameters may be retrieved from the current application attributes database. These attributes are compared with attributes within the current metadata attributes database to determine whether these attributes are present in the metadata stream. If they are present, this step also determines whether the arc parameters set by the application are the same as those in the metadata stream as indicated in the current metadata attributes database.

If the attributes do not match, the current metadata attributes database is updated with those retrieved from the current application attributes database (step 806). Thereafter, the attributes associated with the primitive call to draw the primitive are placed in the metadata stream (step 808), and the primitive call is placed into the metadata stream (step 810) with the process terminating thereafter.

With reference now to step 804, if the retrieved attributes match the attributes found in the current metadata attributes database, the process proceeds directly to step 810 as described above.

Figure 9:
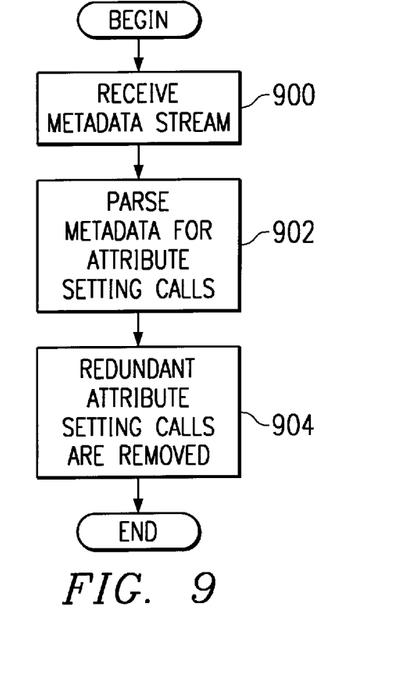
FIG. 9 is a flowchart of a process for processing a metadata stream in accordance with a preferred embodiment of the present invention.

With reference now to FIG. 9, a flowchart of a process for processing a metadata stream is depicted in accordance with a preferred embodiment of the present invention. The process begins by receiving a metadata stream (step 900). The metadata stream is parsed for redundant attribute setting calls (step 902). Redundant attribute setting calls are removed from the metadata stream (step 904) with the process terminating thereafter. In removing redundant attribute calls in the depicted example, only attribute calls associated with primitives are removed from the metadata stream when the processing is directed towards graphics.

Figure 10A:
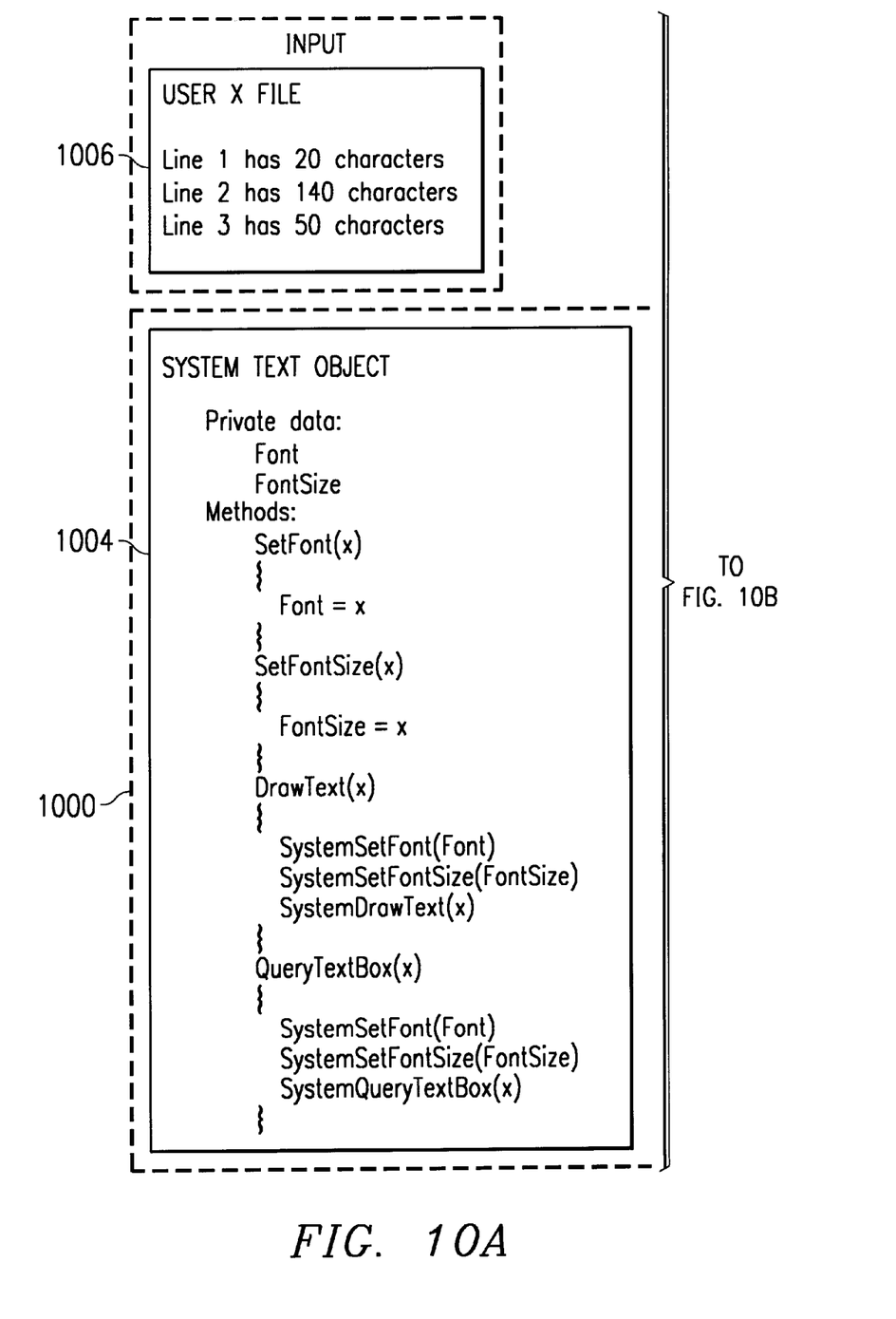
FIG. 10 is a diagram of pseudo code and data in a metadata stream in accordance with a preferred embodiment of the present invention.
Figure 10B:
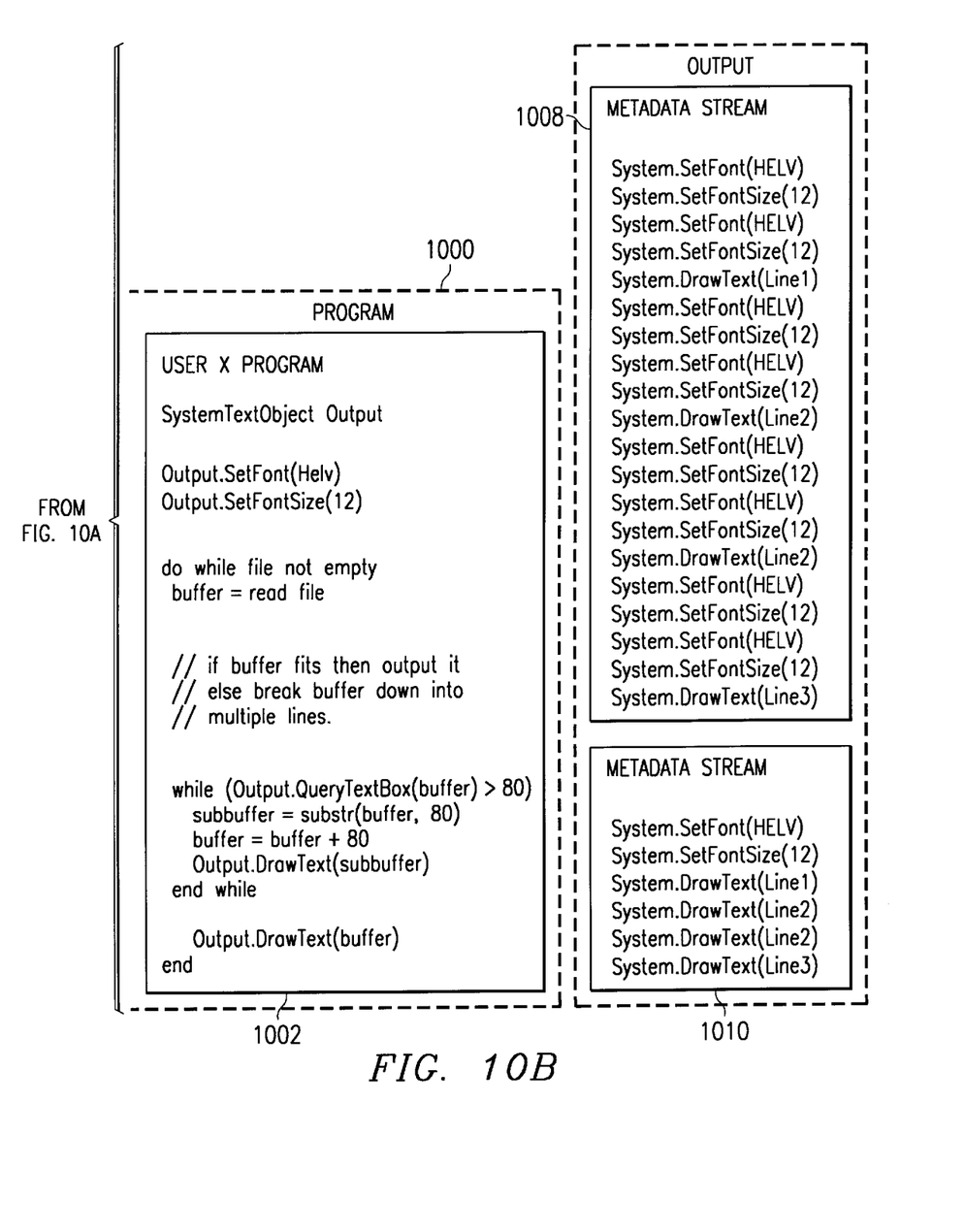

Turning now to FIG. 10, a diagram of pseudo code and data in a metadata stream is depicted in accordance with a preferred embodiment of the present invention. This figure illustrates how the processes of the present invention will alter and compact a metadata stream. Program 1000 in this example includes a user program 1002 and a system object 1004. User program 1002 is unaware as to how system object 1004 handles its functions. System object 1004 may be an object located within system object/libraries 404 in FIG. 4 while user program 1002 may be a program or object within application layer 402 in FIG. 4. In response to input 1006, program 1000 normally generates metadata stream 1008. When the processes of the present invention are applied in handling attribute and primitive calls from program 1000, metadata stream 1010 is generated instead of metadata stream 1008. As can be seen, metadata stream 1010 is more compact than metadata stream 1008 and eliminates redundant attribute settings.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method in a data processing system for generating a metadata stream, the method comprising the data processing system implemented steps of:

receiving an attribute call to set an attribute;

querying a first group of attributes to determine whether the attribute call is present and identical within the first group of attributes;

updating the group of attributes in response to an absence of a determination that the attribute call is present and identical to an attribute call in the first group attributes;

receiving a primitive call;

retrieving an attribute associated with the primitive from the first group of attributes;

determining whether the attribute call associated with the primitive is present and identical to an attribute call in a second group of attributes;

updating the second group of attributes to include the attribute call associated with the primitive call in response to an absence of a determination that the attribute call associated with the primitive call is present and identical in the second group of attributes; and placing the attribute call associated with the primitive call and the primitive call in the metadata stream.

2. The method of claim 1 further comprising:

sending the metadata stream to an output device.

3. The method of claim 1 further comprising:

sending the metadata stream to a file.

4. The method of claim 1, wherein the first group of attributes and the second group of attributes are located in a data structure.

5. The method of claim 4, wherein the data structure is located in a random access memory.

6. The method of claim 1, wherein the first group of attributes is located in a first database and the second group of attributes are located in a second database.

7. A method in a data processing system for generating a metadata stream, the method comprising the data processing system implemented steps of:

receiving an attribute call to set an attribute;

querying a first database to determine whether the attribute call is present and identical in a first data structure;

updating the first data structure in response to an absence of a determination that the attribute call is present and identical to an attribute call in the first data structure;

receiving a primitive call;

retrieving an attribute associated with the primitive from the first data structure;

determining whether the attribute call associated with the primitive is present and identical to an attribute call in a second data structure;

updating the second data structure to include the attribute call associated with the primitive call in response an absence of a determination that the attribute call associated with the primitive call is present and identical in the second data structure; and placing the attribute call associated with the primitive call and the primitive call in the metadata stream.

8. The method of claim 7, wherein the first data structure is a current application attributes database.

9. The method of claim 7, wherein the second data structure is a current metadata attributes database.

10. The method of claim 7 further comprising:

sending the metadata stream to an output device.

11. The method of claim 7 further comprising:

sending the metadata stream to a server in communication with the data processing system by an Internet.

12. The method of claim 7 further comprising:

sending the metadata stream to a storage device.

13. The method claim 7, wherein the primitive call is a draw text call.

14. The method of claim 13, wherein the attribute is a font size attribute.

15. A method in a data processing system for processing a metadata stream, the method comprising the data processing system implemented steps of:

receiving a metadata stream from a first process, wherein the metadata stream includes graphics calls;

parsing the metadata stream for redundant attribute setting calls; and removing redundant attribute setting calls from the metadata stream.

16. The method of claim 15, wherein the step of removing the redundant attribute setting calls comprises removing only redundant attribute setting calls based on primitive calls.

17. The method of claim 15 further comprising:

sending the metadata stream to an output device.

18. The method of claim 15 further comprising:

sending the metadata stream to a storage device.

19. The method of claim 15 further comprising:

sending the metadata stream to a server connected to the data processing system by an Internet.

20. A printer system comprising:

a printer, wherein the printer has an input adapter for receiving a metadata stream;

a software module, wherein the software module is for use in sending the metadata stream to the printer and wherein the software module includes:

first instructions for receiving the metadata stream;

second instructions for parsing the metadata stream for redundant attribute setting calls;

third instructions for removing redundant attribute setting calls from the metadata stream;

fourth instructions for sending the metadata stream to the printer.

21. The printer system of claim 20, wherein software module is a printer queue module.

22. The printer system of claim 20, wherein the software module is part of the operating system for a computer.

23. A data processing system for generating a metadata stream, the data processing system comprising:

first receiving means for receiving an attribute call to set an attribute;

querying means for querying a first database to determine whether the attribute call is present and identical in the first database;

first updating means for updating the first database in response to an absence of a determination that the attribute call is present and identical to an attribute call in the first database;

second receiving means for receiving a primitive call;

retrieving means for retrieving an attribute associated with the primitive from the first database;

determination means for determining whether the attribute call associated with the primitive is present and identical to an attribute call in a second database;

second updating means for updating the second database to include the attribute call associated with the primitive call in response an absence of a determination that the attribute call associated with the primitive call is present and identical in the second database; and placing means for placing the attribute call associated with the primitive call and the primitive call in the metadata stream.

24. The data processing system of claim 23, wherein the first database is a current application attributes database.

25. The data processing system of claim 23, wherein the second database is a current metadata attributes database.

26. The data processing system of claim 23 further comprising:

sending means for sending the metadata stream to an output device.

27. The data processing system of claim 23 further comprising:

sending means for sending the metadata stream to a server in communication with the data processing system by an Internet.

28. The data processing system of claim 23 further comprising:

sending means for sending the metadata stream to a storage device.

29. The data processing system of claim 23, wherein the primitive call is a draw text call.

30. The data processing system of claim 29, wherein the attribute is a font size attribute.

31. A data processing system for processing a metadata stream, the data processing system comprising:

receiving means for receiving a metadata stream from a first process, wherein the metadata stream includes graphics calls;

parsing means for parsing the metadata stream for redundant attribute setting calls; and removing means for removing redundant attribute setting calls from the metadata stream.

32. The data processing system of claim 31, wherein the removing means comprises removing only redundant attribute setting calls based on primitive calls.

33. The data processing system of claim 31 further comprising:

sending means for sending the metadata stream to an output device.

34. The data processing system of claim 31 further comprising:

sending means for sending the metadata stream to a storage device.

35. The data processing system of claim 31 further comprising:

sending means for sending the metadata stream to a server connected to the data processing system by an Internet.

36. A computer program product embodied in a computer readable medium for generating a metadata stream, the computer program product comprising:

first instructions for receiving an attribute call to set an attribute;

second instructions for querying a first database to determine whether the attribute call is present and identical in the first database;

third instructions for updating the first database in response to an absence of a determination that the attribute call is present and identical to an attribute call in the first database;

fourth instructions for receiving a primitive call;

fifth instructions for retrieving an attribute associated with the primitive from the first database;

sixth instructions for determining whether the attribute call associated with the primitive is present and identical to an attribute call in a second database;

seventh instructions for updating the second database to include the attribute call associated with the primitive call in response an absence of a determination that the attribute call associated with the primitive call is present and identical in the second database; and eighth instructions for placing the attribute call associated with the primitive call and the primitive call in the metadata stream, wherein the instructions are embodied in the computer readable medium.

37. A computer program product embodied in a computer readable medium for processing a metadata stream, the computer program product comprising:

first instructions for receiving a metadata stream from a first process including graphics calls;

second instructions for parsing the metadata stream for redundant attribute setting calls; and third instructions for removing redundant attribute setting calls from the metadata stream, wherein the instructions are embodied in the computer readable medium.

38. A data processing system for generating a metadata stream, the data processing system comprising:

a bus system;

a communications unit connected to the bus system;

a memory connected to the bus system, wherein the memory includes a set of instructions; and a processing unit connected to the bus system, wherein the processing unit executes the set of instructions to receive an attribute call to set an attribute; query a first group of attributes to determine whether the attribute call is present and identical within the first group of attributes; update the group of attributes in response to an absence of a determination that the attribute call is present and identical to an attribute call in the first group attributes; receive a primitive call; retrieve an attribute associated with the primitive from the first group of attributes; determine whether the attribute call associated with the primitive is present and identical to an attribute call in a second group of attributes; update the second group of attributes to include the attribute call associated with the primitive call in response to an absence of a determination that the attribute call associated with the primitive call is present and identical in the second group of attributes; and place the attribute call associated with the primitive call and the primitive call in the metadata stream.

39. A data processing system for generating a metadata stream, the data processing system comprising:

a bus system;

a communications unit connected to the bus system;

a memory connected to the bus system, wherein the memory includes a set of instructions; and a processing unit connected to the bus system, wherein the processing unit executes the set of instructions to receive an attribute call to set an attribute; query a first database to determine whether the attribute call is present and identical in a first data structure; update the first data structure in response to an absence of a determination that the attribute call is present and identical to an attribute call in the first data structure; receive a primitive call; retrieve an attribute associated with the primitive from the first data structure; determine whether the attribute call associated with the primitive is present and identical to an attribute call in a second data structure; update the second data structure to include the attribute call associated with the primitive call in response an absence of a determination that the attribute call associated with the primitive call is present and identical in the second data structure; and place the attribute call associated with the primitive call and the primitive call in the metadata stream.

40. A data processing system for processing a metadata stream, the data processing system comprising:

a bus system;

a communications unit connected to the bus system;

a memory connected to the bus system, wherein the memory includes a set of instructions; and a processing unit connected to the bus system, wherein the processing unit executes the set of instructions to receive a metadata stream from a first process in which the metadata stream includes graphics calls; parse the metadata stream for redundant attribute setting calls; and remove redundant attribute setting calls from the metadata stream.

* * * * *

UNITED STATES PATENT AND TRADEMARK OFFICE
CERTIFICATE OF CORRECTION

PATENT NO.     : 6,510,426 B1
DATED          : January 21, 2003
INVENTOR(S)    : Cohen et al.

It is certified that error appears in the above-identified patent and that said Letters Patent is hereby corrected as shown below:

<u>Title page, Item [54] and Column 1, line 2,</u>
After "A", delete "METADATAS" And insert -- METADATA --.

<u>Column 11,</u>
Line 45, after "stream", insert -- wherein the instructions are embodied in the computer readable medium --.

Signed and Sealed this

Twenty-sixth Day of August, 2003

JAMES E. ROGAN
*Director of the United States Patent and Trademark Office*